(12) United States Patent
Przybyla et al.

(10) Patent No.: US 11,486,961 B2
(45) Date of Patent: Nov. 1, 2022

(54) OBJECT-LOCALIZATION AND TRACKING USING ULTRASONIC PULSES WITH REFLECTION REJECTION

(71) Applicant: Chirp Microsystems, Berkeley, CA (US)

(72) Inventors: Richard Przybyla, Piedmont, CA (US); Mitchell Kline, Alameda, CA (US)

( * ) Notice: Subject to any disclaimer, the term of this patent is extended or adjusted under 35 U.S.C. 154(b) by 405 days.

(21) Appl. No.: 16/441,302

(22) Filed: Jun. 14, 2019

(65) Prior Publication Data

US 2020/0393534 A1 Dec. 17, 2020

(51) Int. Cl.
*G01S 3/80* (2006.01)
*G01S 5/26* (2006.01)

(52) U.S. Cl.
CPC ...................................... *G01S 5/26* (2013.01)

(58) Field of Classification Search
None
See application file for complete search history.

(56) References Cited

U.S. PATENT DOCUMENTS

| | | | | | |
|---|---|---|---|---|---|
| 2,370,385 | A | * | 2/1945 | Abraham | G01H 7/00 73/586 |
| 5,645,077 | A | * | 7/1997 | Foxlin | A61B 5/1114 600/587 |
| 5,812,257 | A | * | 9/1998 | Teitel | G01S 7/06 342/463 |
| 6,162,191 | A | * | 12/2000 | Foxlin | A61B 5/1114 128/897 |
| 6,246,898 | B1 | * | 6/2001 | Vesely | G01H 3/00 600/424 |
| 6,757,068 | B2 | * | 6/2004 | Foxlin | G02B 27/017 356/139.03 |
| 7,034,779 | B2 | * | 4/2006 | Ebersole, Jr. | A62B 9/006 345/7 |
| 7,056,216 | B2 | * | 6/2006 | Ohshima | G06F 3/011 463/36 |
| 7,301,648 | B2 | * | 11/2007 | Foxlin | G02B 27/017 356/620 |
| 7,554,511 | B2 | * | 6/2009 | Fager | A63F 13/10 345/7 |
| 7,610,558 | B2 | * | 10/2009 | Morita | G06T 19/006 463/32 |

(Continued)

FOREIGN PATENT DOCUMENTS

| WO | WO-2004095056 A1 | * | 11/2004 | ............... G01S 5/18 |
|---|---|---|---|---|
| WO | WO-2016132282 A1 | * | 8/2016 | ........... G01S 15/523 |

*Primary Examiner* — Isam A Alsomiri
*Assistant Examiner* — Jonathan D Armstrong (57) ABSTRACT

Methods and systems are disclosed for determining pose information for at least one of a transmitter and receiver, both of which comprise ultrasonic transducers. A relative position is determined between the transmitter and the receiver and an orientation for at least is also determined. After obtaining field of view data for at least one of the transmitter and receiver, a field of view between them is determined, based at least in part on the field of view data, the determined relative position and the determined orientation. The pose information is then determined by weighting measurements of an ultrasonic signal emitted by the transmitter and received by the receiver based at least in part on the determined field of view relationship.

21 Claims, 6 Drawing Sheets

(56) References Cited

U.S. PATENT DOCUMENTS

| | | | | |
|---|---|---|---|---|
| 7,716,008 B2* | 5/2010 | Ohta | G06F 3/0346 | 702/152 |
| 7,774,155 B2* | 8/2010 | Sato | A63F 13/06 | 702/127 |
| 7,927,216 B2* | 4/2011 | Ikeda | A63F 13/235 | 463/38 |
| 7,931,535 B2* | 4/2011 | Ikeda | A63F 13/235 | 463/38 |
| 7,942,745 B2* | 5/2011 | Ikeda | A63F 13/24 | 463/38 |
| 8,022,862 B2* | 9/2011 | Larocque | G01F 23/284 | 342/94 |
| 8,094,090 B2* | 1/2012 | Fisher | A63B 24/0006 | 345/8 |
| 8,179,604 B1* | 5/2012 | Prada Gomez | G02B 27/0093 | 359/630 |
| 8,267,786 B2* | 9/2012 | Ikeda | A63F 13/2145 | 463/37 |
| 8,308,563 B2* | 11/2012 | Ikeda | A63F 13/10 | 463/37 |
| 8,313,379 B2* | 11/2012 | Ikeda | A63F 13/213 | 463/38 |
| 8,600,443 B2* | 12/2013 | Kawaguchi | H04R 3/005 | 455/563 |
| 8,737,168 B2* | 5/2014 | Somasundaram | H05K 7/1498 | 367/127 |
| 8,947,347 B2* | 2/2015 | Mao | H04R 29/005 | 345/156 |
| 8,965,641 B2* | 2/2015 | Smith | G01S 13/865 | 701/50 |
| 9,104,239 B2* | 8/2015 | Kim | G06F 3/017 | |
| 9,323,055 B2* | 4/2016 | Baillot | G06F 3/0325 | |
| 9,324,229 B2* | 4/2016 | Baillot | G06F 3/012 | |
| 9,354,310 B2* | 5/2016 | Visser | G01S 7/521 | |
| 9,682,320 B2* | 6/2017 | Mao | A63F 13/06 | |
| 9,987,554 B2* | 6/2018 | Stafford | A63F 13/5255 | |
| 10,042,038 B1* | 8/2018 | Lord | G10L 25/51 | |
| 10,073,516 B2* | 9/2018 | Larsen | A63F 13/26 | |
| 10,086,282 B2* | 10/2018 | Mao | A63F 13/428 | |
| 10,318,019 B2* | 6/2019 | Banning | G06F 3/038 | |
| 10,545,219 B2* | 1/2020 | Przybyla | G06F 3/0346 | |
| 10,712,444 B1* | 7/2020 | Kline | G01S 15/89 | |
| 10,747,301 B2* | 8/2020 | Shipes | G06F 3/0346 | |
| 10,795,458 B2* | 10/2020 | Wan | G06F 3/017 | |
| 10,871,570 B2* | 12/2020 | Shamir | G01S 7/4802 | |
| 10,895,628 B2* | 1/2021 | Chen | G06F 3/011 | |
| 10,942,252 B2* | 3/2021 | Chen | G02B 27/017 | |
| 2002/0024675 A1* | 2/2002 | Foxlin | G06F 3/0346 | 356/620 |
| 2006/0284792 A1* | 12/2006 | Foxlin | G02B 27/017 | 345/8 |
| 2009/0187374 A1* | 7/2009 | Baxter | G06F 3/0304 | 702/152 |
| 2009/0262604 A1* | 10/2009 | Funada | G01S 11/16 | 367/127 |
| 2010/0128568 A1* | 5/2010 | Han | G01S 11/16 | 367/99 |
| 2012/0229377 A1* | 9/2012 | Kim | G06F 3/017 | 345/157 |
| 2014/0055352 A1* | 2/2014 | Davis | G06F 3/0304 | 345/156 |
| 2015/0032412 A1* | 1/2015 | Chizhevskiy | G01S 17/00 | 702/158 |
| 2015/0301153 A1* | 10/2015 | Foxlin | G01S 3/7835 | 367/128 |
| 2016/0217574 A1* | 7/2016 | Kang | G01S 15/8977 | |
| 2017/0343637 A1* | 11/2017 | Przybyla | G01S 15/74 | |
| 2018/0074158 A1* | 3/2018 | Chen | G01S 5/14 | |
| 2018/0143292 A1* | 5/2018 | Przybyla | G06F 3/00 | |
| 2018/0143317 A1* | 5/2018 | Chen | G06T 7/74 | |
| 2018/0143696 A1* | 5/2018 | Chen | G01P 13/00 | |
| 2018/0180711 A1* | 6/2018 | Chen | G02B 27/017 | |
| 2018/0180712 A1* | 6/2018 | Chen | G01P 15/02 | |
| 2018/0188353 A1* | 7/2018 | Chen | G01S 5/30 | |
| 2018/0191436 A1* | 7/2018 | Kadambala | G06T 7/248 | |
| 2018/0368807 A1* | 12/2018 | Van De Pas | A61B 8/4444 | |
| 2019/0026904 A1* | 1/2019 | Chen | G06T 7/74 | |
| 2019/0089468 A1* | 3/2019 | Przybyla | H04L 9/30 | |
| 2019/0187244 A1* | 6/2019 | Riccardi | G01C 21/165 | |
| 2020/0211207 A1* | 7/2020 | Chen | G06T 7/70 | |

* cited by examiner

OBJECT-LOCALIZATION AND TRACKING USING ULTRASONIC PULSES WITH REFLECTION REJECTION

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. 1.14.

FIELD OF THE PRESENT DISCLOSURE

This invention relates to localization and tracking and more particularly to systems and methods for estimating relative location and/or relative orientation based on ultrasonic time-of-flight and/or time-difference-of-arrival measurements using a determined field of view relationship.

BACKGROUND

The development of microelectromechanical systems (MEMS) has enabled the incorporation of a wide variety of sensors into mobile devices, such as cell phones, laptops, tablets, wearable devices, gaming devices and other portable, electronic devices. Non-limiting examples of such sensors include an accelerometer, a gyroscope, a magnetometer, a pressure sensor, a microphone, a proximity sensor, an ultrasound sensor, an ambient light sensor, an infrared sensor, and the like. Further, sensor fusion processing may be performed to combine the data from a plurality of sensors to provide an improved characterization of the device's motion or orientation.

Numerous applications may benefit from the use of such sensors to determine the position and/or motion of a portable device. As one non-limiting example, Augmented Reality (AR) systems and Virtual reality (VR) systems often have a Head Mounted Display (HMD) for which it would be desirable to provide user input via a portable device, such as a controller that is either worn or held in a user's hand. Correspondingly, the HMD may employ position information about the controller and/or information characterizing the motion of the controller for a wide range of user inputs, including recognition of predetermined gestures or creating a correspondence between the physical controller and a virtual object, such as a cursor or pointer. To provide that information, a controller sometimes will include an inertial measurement unit (IMU). Likewise, position information may also be obtained from ultrasonic tracking systems. These ultrasonic systems can provide a valuable independent source of position information to be used in combination with the position information from the IMU, but are subject to certain drawbacks, such as the performance degradation that occurs when a reflected ultrasonic signal is misinterpreted as a directly received signal when used for making time of flight (TOF) and/or time difference of arrival (TDOA) determinations.

Given the above characteristics, it would be desirable to provide systems and methods for locating and tracking objects that improve the performance of the ultrasonic system by determining a field of view relationship between an ultrasonic transmitter and receiver. As will be described in the following materials, the techniques of this disclosure satisfy this and other needs.

SUMMARY

As will be described in detail below, this disclosure includes a method that involves providing at least a first transmitter comprising an ultrasonic transducer, providing at least a first receiver comprising an ultrasonic transducer, determining a relative position in three dimensional space between the first transmitter and the first receiver, determining an orientation in three dimensional space of at least one of the first transmitter and the first receiver, obtaining field of view data for the at least one of first transmitter and the first receiver, determining a field of view relationship between the first transmitter and the first receiver based at least in part on the field of view data, the determined relative position and the determined orientation and determining pose information for at least one of the first transmitter and the first receiver by weighting measurements of an ultrasonic signal emitted by the first transmitter and received by the first receiver based at least in part on the determined field of view relationship.

The disclosure also relates to a system for tracking at least one object. The system includes a first transmitter having an ultrasonic transducer, a first receiver having an ultrasonic transducer, wherein the at least one object comprises either the first transmitter or the first receiver and at least one processor, which is configured to determine a relative position in three dimensional space between the first transmitter and the first receiver, determine an orientation in three dimensional space of at least one of the first transmitter and the first receive, obtain field of view data for at least one of the first transmitter and the first receiver, determine a field of view relationship between the first transmitter and the first receiver based at least in part on the field of view data, the determined relative position and the determined orientation and determine pose information for at least one of the first transmitter and the first receiver by weighting measurements of an ultrasonic signal emitted by the first transmitter and received by the first receiver based at least in part on the determined field of view relationship.

This disclosure also relates to a sensor processing unit, which includes a sensor and at least one processor configured to determine a relative position in three dimensional space between a first ultrasonic transmitter and a first ultrasonic receiver, determine an orientation in three dimensional space of at least one of the first transmitter and the first receiver, obtain field of view data for at least one of the first transmitter and the first receiver, determine a field of view relationship between the first transmitter and the first receiver based at least in part on the field of view data, the determined relative position and the determined orientation and determine pose information for at least one of the first transmitter and the first receiver by weighting measurements of an ultrasonic signal emitted by the first transmitter and received by the first receiver based at least in part on the determined field of view relationship

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The invention has been developed in response to the present state of the art and, in particular, in response to the problems and needs in the art that have not yet been fully solved by currently available apparatus and methods. Accordingly, the invention has been developed to provide apparatus and methods for localization and tracking of objects and, more particularly, using periodic ultrasonic pulses to determine location and/or orientation between one or more components in three dimensional space using a determined field of view relationship, such as by discriminating between directly received and reflected signals.

Figure 1:
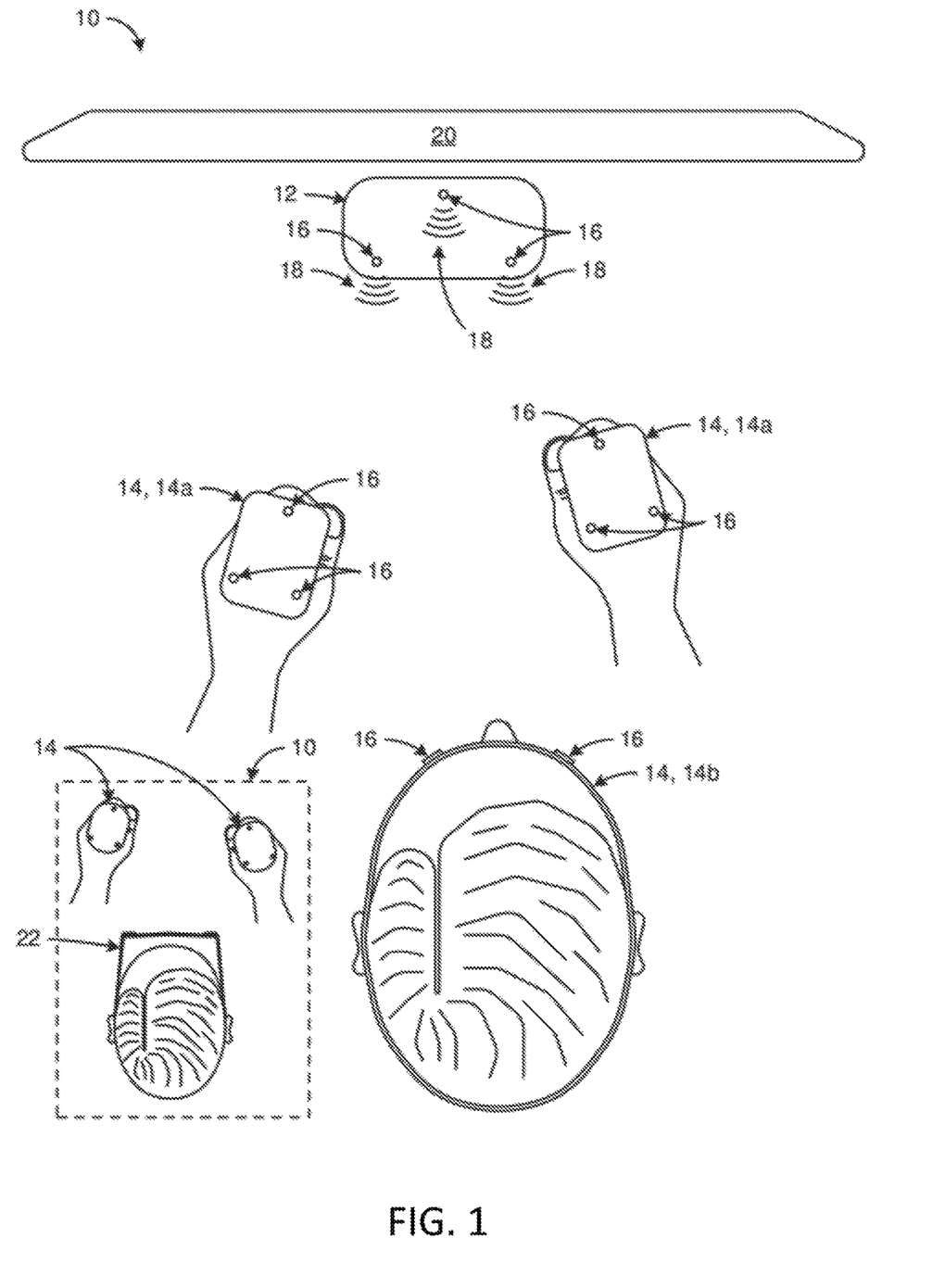
FIG. 1 is a schematic diagram illustrating a top view of one embodiment of a system as the system is being used by a human user in accordance with an embodiment.

Referring to FIG. 1, a system 10 in accordance with the present invention may include a base station 12 and one or more tracked objects 14 whose relative location and/or orientation with respect to the base station 12 may be tracked. Tracked objects 14 may be free to move with respect to one another and with respect to a base station 12. For example, one or more tracked objects 14 may be manipulated (e.g., translated, rotated, or some combination thereof) in three dimensional space by one or more human users of a system 10. In certain embodiments, a base station 12 may also be manipulated (e.g., translated, rotated, or some combination thereof) in three dimensional space by one or more human users of a system 10. Details regarding one suitable system may be found in commonly-owned U.S. patent application Ser. No. 15/360,673, filed Nov. 23, 2016, which is entitled "THREE DIMENSIONAL OBJECT-LOCALIZATION AND TRACKING USING ULTRASONIC PULSES," which is incorporated by reference in its entirety.

In selected embodiments, each of the base station 12 and one or more tracked objects 14 may include one or more ultrasonic transducers 16 that selectively transmit and/or receive one or more ultrasonic pulses 18. The locations of all the transducers 16 on a base station 12 and the locations of all the transducers 16 on one or more tracked objects 16 may be known based on the mechanical design of the base station 12 and one or more tracked objects 14, respectively. Accordingly, information corresponding to the one or more ultrasonic pulses 18 (e.g., time-difference-of-arrival (TDOA), time-of-flight (TOF), or the like) may be used to estimate the relative locations and/or orientations of the base station 12 and one or more tracked objects 14 with respect to one another. As will be appreciated, a tracked object 14 may transmit (broadcast) an ultrasonic signal that is received by base station 12 or vice versa. Similarly, a tracked object 14 and base station 12 may each transmit and receive ultrasonic signals so that a relative position of either may be determined from the perspective of the other. This relative position may be expressed in terms of an absolute frame of reference that applies to both tracked object 14 and base station 12 and/or a relative frame of reference for either.

In certain embodiments, a system 10 may enable one or more human users thereof to interact with or participate in a virtual reality (VR) environment, mediated reality (MR) environment, augmented reality (AR) environment, remote surgery (also known as telesurgery), or the like. Accordingly, in certain embodiments, a system 10 may include one or more screens 20.

A screen 20 may display visual content. Movements imposed by one or more users on a base station 12, one or more tracked objects 14, or some combination thereof may be detected and used in some manner to affect, change, or interact with the visual content displayed on a screen 20. For example, in certain embodiments, at least a portion of that visual content displayed on a screen 20 may be virtual. Accordingly, movements imposed by one or more users on a base station 12, one or more tracked objects 14, or some combination thereof may be tracked and used to alter, control, or the like the virtual content.

In certain "tethered" embodiments, a system 10 may be or form part of a VR, MR, AR, and/or telesurgery system or the like wherein certain operations (e.g., the computation necessary for tracking) are performed on a personal computer (PC) or gaming console that is connected to an head-mounted display (HMD) 22. In such embodiments, a base station 12 may be included as part of the HMD 22 or may rest stationary with respect to, connect directly to, and/or form part of or an extension to the PC or gaming console. Accordingly, in selected embodiments, an HMD 22 may be a tracked object 14 that includes one or more screens 20.

In certain "untethered" embodiments, a system 10 in accordance with the present invention may be or form part of a VR, MR, AR, and/or telesurgery system or the like wherein controller tracking (e.g., tracking of one or more tracked objects 14 such as one or more hand-held controllers) and head tracking are performed on an HMD 22 that includes a base station 12 and one or more screens 20.

Accordingly, in selected embodiments, while a system 10 is operating or in use, a base station 12 may be maintained or left in a stationary relationship with respect to the earth and/or with respect to one or more screens 20. For example, in selected embodiments, a base station 12 of a system 10 may sit (e.g., rest in a stationary manner) on a desk, table, or other supporting surface. One or more screens 20 of the system 10 may also sit (e.g., rest in a stationary manner) on a desk, table, or other supporting surface. Accordingly, the base station 12 and one or more screens 20 may be stationary with respect to the earth and with respect to one another.

Alternatively, a base station 12 may be moved by a user while a system 10 is operating or in use. For example, in certain embodiments, a base station 12 and one or more screens 20 may be incorporated within or form part of a head-mounted display (HMD) 22. Accordingly, the base station 12 and one or more screens 20 may be stationary with respect each other, yet move with respect to the earth as dictated by a human user.

Tracked objects 14 in accordance with the present invention may have any suitable form. For example, a tracked object 14 may be a hand-held controller 14a or wand 14a, ring, wrist band, glove (e.g., a glove with one or more ultrasonic transducers 16 on each finger to enable the location and/or orientation of each finger or finger joint to be tracked). Alternatively, or in addition thereto, one or more tracked objects 14 may correspond to something other than a user's hands. For example, one or more tracked objects 14 may be mounted to or worn on other body parts such as arms, legs, feet, and/or head. For example, a tracked object 14 may be a head-worn device such as a hat, visor, head band 14b, pair of glasses or goggles, face mask, or the like or a combination or sub-combination thereof.

Figure 2:
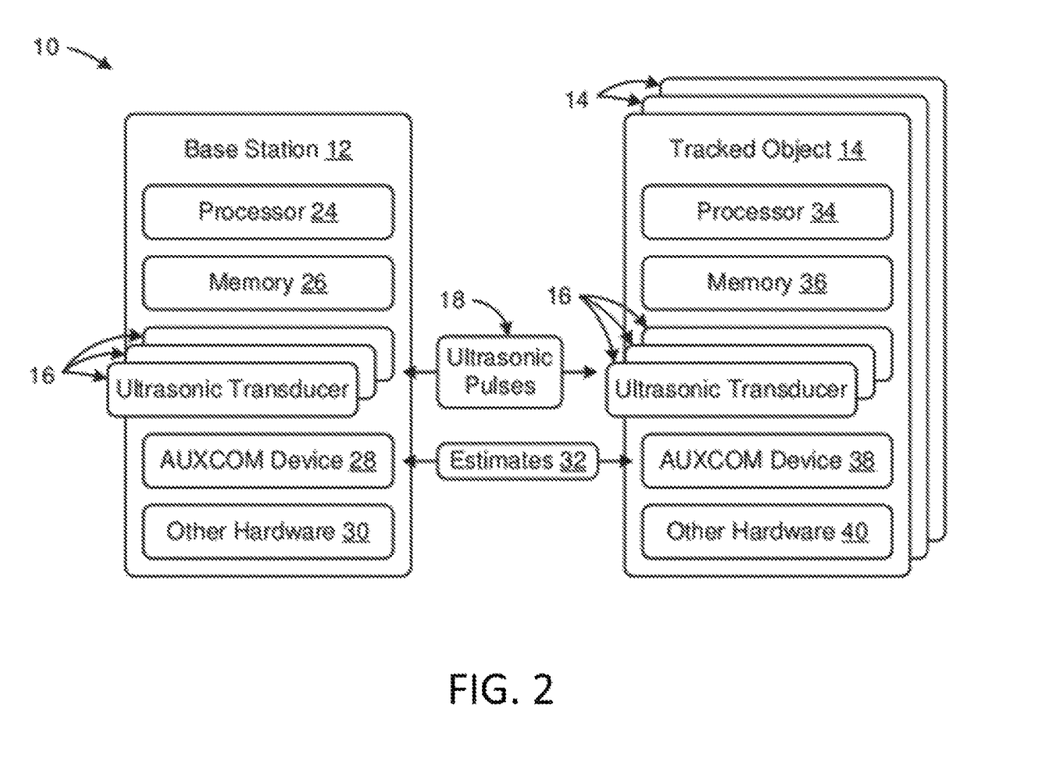
FIG. 2 is a schematic block diagram illustrating one embodiment of the internal makeup of various components of a system in accordance with an embodiment.

Referring to FIG. 2, a base station 12 in accordance with the present invention may transmit one or more ultrasonic pulses 18, receive one or more ultrasonic pulses 18, use one or more TDOA and/or TOF measurements to estimate its relative location and/or orientation with respect to one or more tracked objects 14, receive estimates 32 of the relative location and/or orientation of one or more tracked objects 14 with respect thereto, or the like or a combination or sub-combination thereof. A base station 12 may accomplish this in any suitable manner. For example, a base station 12 may be embodied as hardware, software, or some combination thereof.

In selected embodiments, a base station 12 may include computer hardware, other electrical hardware, and computer software. For example, the hardware of a base station 12 may include one or more processors 24, memory 26, one or more ultrasonic transducers 16, one or more auxiliary communications devices 28, other hardware 30 as desired or necessary, or the like or a combination or sub-combination thereof.

The memory 26 of a base station 12 in accordance with the present invention may be operably connected to one or more processors 24 and store data, computer software, or some combination thereof. This may enable one or more processors 24 to execute the computer software, operate on the data, or the like. Accordingly, one or more processors 24 may control one or more operations (e.g., all operations) of a base station 12 by running computer software stored in memory 26.

Each of the ultrasonic transducers 16 of a base station 12 may convert electrical signal into corresponding ultrasonic waves and/or convert ultrasonic waves into corresponding electrical signal. Moreover, each of the ultrasonic transducers 16 of a base station 12 may be embodied within a different ultrasonic receiver, ultrasonic transmitter, or ultrasonic transceiver. Accordingly, operating in conjunction with other supporting hardware 30 (e.g., inertial motion sensors as described below) and/or software systems stored in memory 26 (e.g., hardware and/or software modulators, demodulators, or the like), each ultrasonic transducer 16 of a base station 12 may be an independent source or recipient of one or more ultrasonic transmissions. In selected embodiments, a base station 12 may include three or more ultrasonic transducers 16, each embodied within or forming part of a different ultrasonic transceiver. This may enable three vectors (e.g., in Cartesian coordinates ($x_1$, $y_1$, $z_1$), ($x_2$, $y_2$, $z_2$), ($x_3$, $y_3$, $z_3$)) respectively representing the coordinates of the three transducers 16 with respect to a tracked object 14 to be calculated using TDOA and/or TOF measurements collected for one or more ultrasonic pulses 18.

A base station 12 may communicate with (i.e., send information to and/or receive information from) one or more tracked objects 14. For example, in selected embodiments, each tracked object 14 may use one or more ultrasonic pulses 18 transmitted by a base station 12 to estimate its location and/or orientation with respect to the base station 12. Accordingly, communication between the base station 12 and the one or more tracked objects 14 may enable the base station 12 to receive the location and/or orientation estimates 32 generated by the one or more tracked objects 14.

A base station 12 may communicate with one or more tracked objects 14 in any suitable manner. In selected embodiments, a base station 12 may communicate with one or more tracked objects 14 by encoding and/or decoding information within one or more ultrasonic transmissions. Alternatively, a base station 12 and one or more tracked objects 14 may use ultrasonic transmissions for localization and tracking and may use an auxiliary communication path (e.g., wireless radio transmission, wired serial communication, or the like) to communicate (e.g., receive estimates 32). In such embodiments, an auxiliary communication device 28 may provide, enable, or support the auxiliary communication path A tracked object 14 in accordance with the present invention may transmit one or more ultrasonic pulses 18, receive one or more ultrasonic pulses 18, use one or more TDOA and/or TOF measurements to estimate its relative location and/or orientation with respect to a corresponding base station 12, transmit estimates 32 of its relative location and/or orientation to a corresponding base station 12 or the like or a combination or sub-combination thereof. A tracked object 14 may accomplish this in any suitable manner. For example, a tracked object 14 may be embodied as hardware, software, or some combination thereof.

In selected embodiments, a tracked object 14 may include computer hardware, other electrical hardware, and computer software. For example, the hardware of a tracked object 14 may include one or more processors 34 (e.g., microprocessors), memory 36, one or more ultrasonic transducers 16, one or more auxiliary communications devices 38, other hardware 40 (e.g., inertial motion sensors as described below) as desired or necessary, or the like or a combination or sub-combination thereof.

The memory 36 of a tracked object 14 in accordance with the present invention may be operably connected to one or more processors 34 and store data, computer software, or some combination thereof. This may enable one or more processors 34 to execute the computer software, operate on the data, or the like. Accordingly, one or more processors 34 may control one or more operations (e.g., all operations) of a tracked object 14 by running computer software stored in memory 36.

Each of the ultrasonic transducers 16 of a tracked object 14 may convert electrical signal into corresponding ultrasonic waves and/or convert ultrasonic waves into corresponding electrical signal. Moreover, each of the ultrasonic transducers 16 of a tracked object 14 may be embodied within a different ultrasonic receiver, ultrasonic transmitter, or ultrasonic transceiver. Accordingly, operating in conjunction with other supporting hardware 40 and/or software systems stored in memory 36 (e.g., hardware and/or software based modulators, demodulators, or the like), each ultrasonic transducer 16 of a tracked object 14 may be an independent source or recipient of one or more ultrasonic transmissions.

In selected embodiments, one or more tracked objects 14 and/or base station 12 within a system 10 may each include three transducers 16, each embodied within or forming part of a different ultrasonic transceiver. This may enable three vectors (e.g., in Cartesian coordinates $(x_1, y_1, z_1)$, $(x_2, y_2, z_2)$, $(x_3, y_3, z_3)$) respectively representing the coordinates of the three transducers 16 with respect to a base station 12 to be calculated using TDOA and/or TOF measurements collected for one or more ultrasonic pulses 18. Accordingly, when a tracked object 14 and/or base station 12 has more than one transducer 16, the respective coordinate vectors of the transducers 16 may be used, along with the known locations of the transducers 16 on the tracked object 14, to determine both the location and orientation of the tracked object 14 relative to a corresponding base station 12.

A tracked object 14 may communicate with (i.e., send information to and/or receive information from) a base station 12. For example, in selected embodiments, a tracked object 14 may transmit to a corresponding base station 12 the location and/or orientation estimates 32 prepared by the tracked object 14. In selected embodiments, a tracked object 14 may communicate with a base station 12 by encoding and/or decoding information within one or more ultrasonic transmissions. Alternatively, an auxiliary communication device 38 may provide, enable, or support an auxiliary communication path between a tracked object 14 and a base station 12.

When using ultrasonic pulses 18 to estimate relative location and/or orientation, it may be desirable or necessary to have a mechanism for distinguishing the ultrasonic pluses 18 emanating from one transducer 16 from the ultrasonic pulses 18 emanating from another. Accordingly, in certain embodiments, each transmitting transducer 16 on a base station 12 and/or tracked object 14 may transmit ultrasonic pulses 18 encoded with identifying information. That is, each ultrasonic pulse 18 may be encoded with a distinct identification code that allows any recipient thereof within a system 10 to identify the transducer 16 that generated the ultrasonic pulse 18. Various encoding schemes may be used to encode such identifications. In certain embodiments, information identifying sources of one or more ultrasonic pulses 18 may be encoded using phase-shift keying (PSK) such as quadrature phase-shift keying (QPSK) or differential phase-shift keying (DPSK).

As discussed above, techniques of this disclosure involve determining pose information for ultrasonic transducers acting as receivers or transmitters. In some embodiments, the techniques may be augmented through the use of other sensor information, such as motion sensor information. Details regarding one suitable architecture that may be employed in such embodiments for either base station 12 or tracked object 14 are depicted as high level schematic blocks in FIG. 3 as device 102. As used herein, the term "pose information" unless indicated otherwise may refer to either or both position and orientation. As discussed above, pose information may be expressed in terms of an absolute frame of reference that applies to both tracked object 14 and base station 12 and/or a relative frame of reference for either. Further, given that motion is a change in position or orientation, pose information may also include motion information. For example, a given sequence of orientations and/or positions may be associated with a predetermined gesture that may be recognized to provide a user input or may also be mapped to a virtual object for controlling that object as a user input. Further, in addition to the context of system 10, base station 12 and tracked objects 14, the techniques of this disclosure may be applied to any system employing a suitable ultrasonic system. As such, in different embodiments, device 102 may be another portable device, including a mobile phone (e.g., cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

Figure 3:
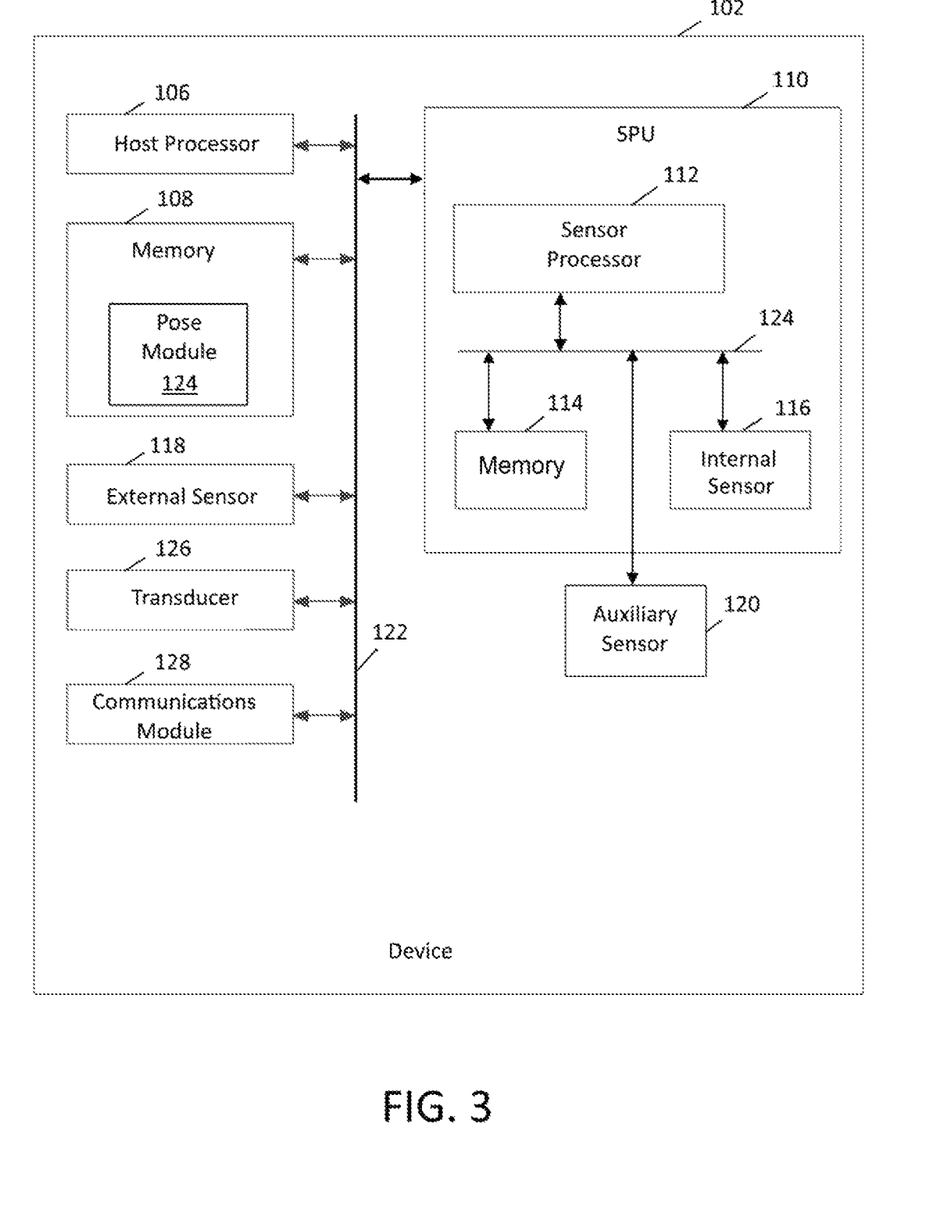
FIG. 3 is a schematic block diagram a suitable device architecture according to an embodiment.

As shown, device 102 includes a host processor 106, which may be one or more microprocessors, central processing units (CPUs), or other processors, generally corresponding to processor 24 and 34 of base station 12 and tracked object 14 respectively, to run software programs which may be stored in memory 108, likewise generally corresponding to memory 26 and 36 of base station 12 and tracked object 14 respectively, associated with the functions of device 100. In some embodiments, device 102 includes at least one sensor assembly, as shown here in the form of integrated sensor processing unit (SPU) 110 featuring sensor processor 112, memory 114 and internal sensor 116, and may also be considered an inertial measurement unit (IMU). Memory 114 may store algorithms, routines or other instructions for processing data output by internal sensor 116 and/or other sensors as described below using logic or controllers of sensor processor 112, as well as storing raw data and/or motion data output by internal sensor 116 or other sensors. Depending on the architecture, either memory 114 or memory 108 or a combination may be used for storing data, executable instructions or any other suitable operations involving device 102. Internal sensor 116 may be one or more sensors for measuring motion of device 02 in space, including inertial sensors such as an accelerometer and a gyroscope, or other motion sensors including a magnetometer, a pressure sensor, and ultrasound sensor or others. Depending on the configuration, SPU 110 measures one or more axes of rotation and/or one or more axes of acceleration of the device. In one embodiment, internal sensor 116 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, with the sensor readings transmitted to receiver 104 such that a sensor fusion operation may be performed as described below to combine data from internal sensor 116 to provide a six axis determination of motion or six degrees of freedom (6DOF). Alternatively or in addition, sensor processor 112, or other processing resources of device 102, may perform the sensor fusion. As desired, internal sensor 116 may be implemented using Micro Electro Mechanical System (MEMS) to be integrated with SPU 110 in a single package. Exemplary details regarding suitable configurations of host processor 106 and SPU 110 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. A suitable implementation for SPU 110 in device 102 includes a Motion Processing Unit (MPU®) available from InvenSense, Inc. of San Jose, Calif. In some embodiments, one or more motion algorithm layers may provide motion algorithms for lower-level processing of raw sensor data provided from internal or external sensors. Further, a sensor device driver layer may provide a software interface to the hardware sensors of device 102. Some or all of these layers can be provided in memory 108 for access by host processor 106, in memory 114 for access by sensor processor 112, or in any other suitable architecture.

Alternatively or in addition, device 102 may implement a sensor assembly in the form of external sensor 118. This is optional and not required in all embodiments. External sensor may represent one or more sensors as described above, such as an accelerometer and/or a gyroscope. As used herein, "external" means a sensor that is not integrated with SPU 110 and may be remote or local to device 102. Also alternatively or in addition, SPU 110 may receive data from an auxiliary sensor 120 configured to measure one or more aspects about the environment surrounding device 102. This is optional and not required in all embodiments. For example, a pressure sensor and/or a magnetometer may be used to refine motion determinations made using internal sensor 116. In one embodiment, auxiliary sensor 120 may include a magnetometer measuring along three orthogonal axes and output data to be fused with the gyroscope and accelerometer inertial sensor data to provide a nine axis determination of motion. In another embodiment, auxiliary sensor 120 may also include a pressure sensor to provide an altitude determination that may be fused with the other sensor data to provide a ten axis determination of motion. Again, the sensor fusion involving this optional data from either or both of external sensor 118 and auxiliary sensor 120 may be performed at receiver 104, at device 102, or both. Although described in the context of one or more sensors being MEMS based, the techniques of this disclosure may be applied to any sensor design or implementation.

In the embodiment shown, host processor 106, memory 108, SPU 110 and other components of device 102 may be coupled through bus 122, while sensor processor 112, memory 114, internal sensor 116 and/or auxiliary sensor 120 may be coupled though bus 124, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 102, such as by using a dedicated bus between host processor 106 and memory 108.

As described in further detail below, device 102 may determine any suitable aspect of information regarding the relative position, orientation and/or motion of device 102, i.e. pose information, by executing instructions stored in memory 108 as indicated by pose module 124. Multiple layers of software can be provided in memory 108 and/or memory 114, which may be any combination of computer readable medium such as electronic memory or other storage medium such as hard disk, optical disk, etc., for use with the host processor 106 and/or sensor processor 112. For example, an operating system layer can be provided for device 102 to control and manage system resources in real time, enable functions of application software and other layers, and interface application programs with other software and functions of device 102. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single receiver 104, and in some of those embodiments, multiple applications can run simultaneously. Algorithms, routines or other instructions for processing sensor data may be employed by pose module 124 to perform any of the operations associated with the techniques of this disclosure, such as determining a field of view relationship regarding device 100, such as between base station 12 and tracked object 14 of system 10, and may further include determining the motion, location, distance and/or orientation of device 102. Determining the position, motion or orientation of device 102 may involve sensor fusion or similar operations. Such determinations may be absolute or relative as warranted. Although depicted as being implemented in memory 108, pose module can alternatively be implemented in memory 114 and involve the execution of operations by sensor processor 112, or may involve any desired distribution among the computing resources of device 102.

As noted above, device 102 may include an acoustic signal-based positioning system, represented here as transducer 126, which may correspond to ultrasonic transducer 16 of either base station 12 or tracked object 14 in system 10 for example. Further details regarding a suitable acoustic signal-based positioning system may be found in U.S. Pat. No. 9,897,682, which is hereby incorporated by reference herein in its entirety. In other suitable architectures, transducer 16 may be implemented as internal sensor 116 as part of SPU 110 or auxiliary sensor 120.

Device 102 may also implement a communications module 128 to allow the exchange of any suitable information, including by transmitting position information about device 102 or receiving position information about another device. Communications module 128 may generally correspond to auxiliary communications device 28 and 28 of base station 12 and tracked object 14, respectively. Communications module 128 may employ a Wireless Local Area Network (WLAN) conforming to Institute for Electrical and Electronic Engineers (IEEE) 802.11 protocols, featuring multiple transmit and receive chains to provide increased bandwidth and achieve greater throughput. For example, the 802.11ad (WiGIG™) standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, a wired connection may also be employed. Generally, communication may be direct or indirect, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Figure 4:
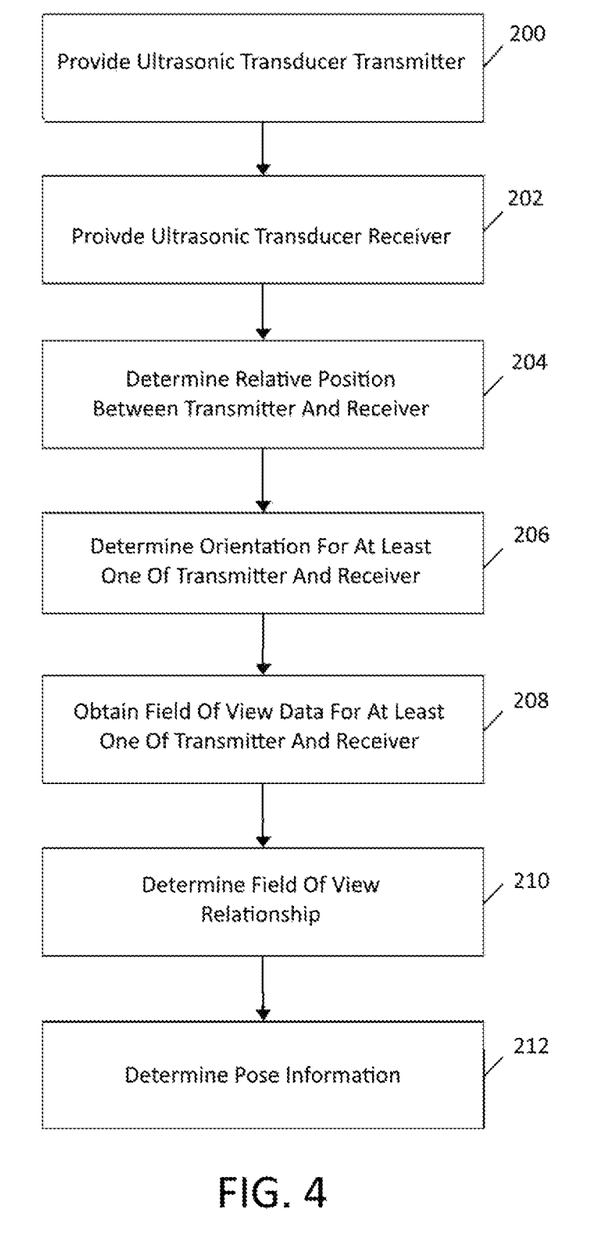
FIG. 4 is a flowchart showing a routine for determining pose information by weighting ultrasonic measurements according to an embodiment.

To help illustrate aspects of the disclosed techniques, FIG. 4 is a schematic flowchart depicting one routine for determining pose information for a transmitter or receiver using a determined field of view relationship. According to the following discussion, it will be appreciated that these operations may be from the perspective of either base station 12 or tracked object 14 in the context of system 10. Similarly, the base station 12 may operate as the transmitter and the tracked object 14 as the receiver or tracked object 14 may operate as the transmitter and base station 12 as the receiver. Thus, beginning with 200, providing a transmitter comprising an ultrasonic transducer may represent either base station 12 or tracked object 14 while in 202, providing a receiver comprising an ultrasonic transducer may represent the other. In 204, a relative position between the transmitter and receiver may be determined, such as by using motion sensor data from SPU 110, ultrasonic information from transducer 126, a combination of these systems, or in any other suitable manner. Then, in 206, the orientation of at least one of the transmitter and receiver is determined, also by using motion sensor data from SPU 110, ultrasonic information from transducer 126, a combination of these systems, or in any other suitable manner. In 208, field of view data is obtained for at least one of the transmitter and receiver. Field of view data includes characteristics of the relevant transducer, which in the context of a transmitter may be the broadcast angle range and in the context of a receiver may be the detection range angle of incoming signals. The field of view data may be binary. For example, for a receiver this means setting a threshold angle for when the receiver receives, or not. The field of view data may also be more granular or gradual, for example specifying transmission power/receiving sensitivity as a function of the angle. Field of view data may further include any other information that relates to the transducer performance. Correspondingly, in 210 a field of view relationship between the transmitter and the receiver is determined, based at least in part on the field of view data, the determined relative position and the determined orientation. Using the determined field of view relationship, pose information for at least one of the transmitter and receiver is determined in 212. As will be discussed in further detail below, determining pose information includes weighting measurements of an ultrasonic signal emitted by the transmitter and received by the receiver.

As will be appreciated, the field of view relationship may refer to the orientation of the receiver so that based upon the reception characteristics of this transducer, from the field of view data, it may be determined whether a line of sight exists between the receiver and the known relative position of the transmitter, that is whether the transmitter is within the field of view of the receiver. Alternatively, the field of view relationship may refer to the orientation of the transmitter so that based upon the transmission characteristics of this transducer, from the field of view data, it may be determined whether a line of sight exists between the transmitter and the known relative position of the receiver, that is whether the receiver is within the field of view of the transmitter. In either aspect, a possibility exists that despite a line of sight existing to the known relative position of the either the receiver or transmitter, the orientation of that component may not allow direct signal reception, such as when the component is facing away from the corresponding transducer. Accordingly, determining the field of view relationship from both perspectives represents a more complete characterization, but as desired, in some embodiments it may be expedient to perform the determination from one perspective only or as an initial determination.

The purpose of establishing whether a line of sight exists between the transmitter and receiver is to help distinguish among direct and reflected signals. A direct signal refers to the propagation of an ultrasonic signal emitted by the transmitter along a straight path to the receiver. Conversely, a reflected signal does not propagate along a straight path, but instead "bounces" off one or more intervening objects, traveling a further distance than required by the relative positioning of the transmitter and receiver. Since a reflected signal travels a further distance than the straight line, basing TOF or TDOA calculations on a reflected signal degrades the accuracy of the pose information determination. Accordingly, as used herein, the term reception probability refers to the degree of confidence that a transmitted signal will be directly received. Thus, in a similar manner to the concepts described above, the reception probability may be determined from the perspective of either or both the transmitter and receiver.

Likewise, the purpose of weighting measurements of a received ultrasonic signal is to reduce or eliminate degradation in the accuracy of a pose information determination for either or both the transmitter and receiver. Thus, in some embodiments, the weighting may be binary with the result of either including or excluding the measurements for a given signal based on the reception probability. In such embodiments, the reception probability may be binary as well, or may reflect a range of values. When using a range of values, different thresholds may be used when including or excluding measurements. For example, for a higher degree of accuracy, it may be desirable to exclude measurements unless there is corresponding high degree of confidence that the signal is direct. In other applications, it may be desirable to employ a more lax threshold. Further, the threshold may be dynamically adaptive depending on circumstances. For example, during initial operation or during a reset, it may be desirable to increase the amount of information available by using a full weighting of the ultrasonic measurements so that none are rejected. Consequently, after a threshold period of time and/or after a threshold of confidence is reached with regard to the determined relative positions and orientations, weighting can be applied to help reduce the use of reflected signals as discussed above. As a similar example, rather than using a full weighting for all the ultrasonic measurements, a lower threshold may be used and then increased as confidence in the quality of pose information determination improves and/or after a threshold period of time elapses. As an alternative to binary weighting, any value in the range of one to zero may be applied, with one representing fully incorporating the ultrasonic measurements and zero representing complete exclusion. The weighting value may correspond to the reception probability or any other suitable metric. Further, as discussed above, the weighting may be dynamically adaptive, and may include switching between the weighting techniques.

As one non-limiting illustration, the weighting may reflect the certainty regarding one or more of the factors affecting the field of view relationship. For example, determining pose information may involve the use of a state estimation technique, such as a Kalman filter or the like, which may inherently provide a confidence measure. Correspondingly, if the position and/or orientation for the receiver or transmitter is more certain, the field of view relationship may likewise be more certain and warrant a more aggressive exclusion or down weighting of signals determined to have been reflected. Conversely, if the position and/or orientation is less certain, it may be desirable to reduce the exclusion or be more permissive in the use of ultrasonic measurements, as it may be less clear that they are reflected. As another non-limiting illustration, field of view data as discussed above may include characteristics such as a range of transmission or reception angles. Correspondingly, the field of view relationship may be considered more certain if it relates to angles closer to the middle of the range as opposed to those at the periphery and the weighting of ultrasonic measurements can reflect these considerations.

Figure 5:
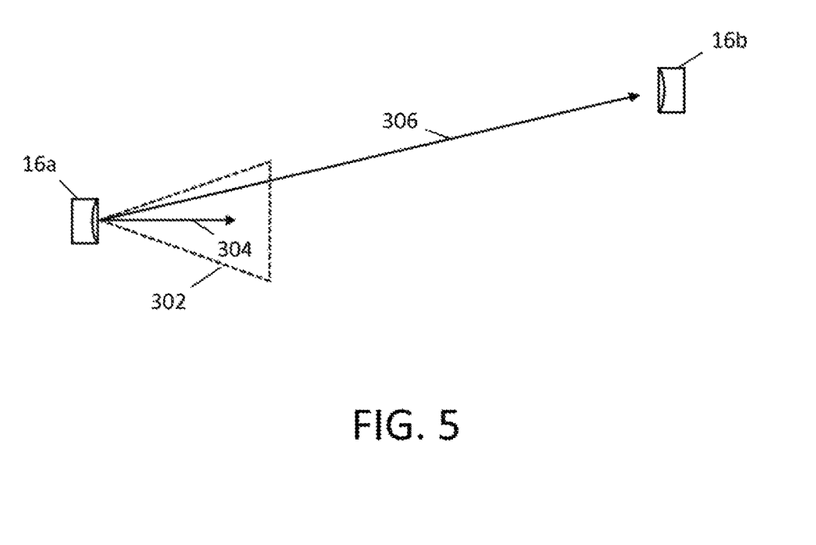
FIG. 5 is a schematic diagram showing one technique for determining a field of view relationship according to an embodiment.

Turning now to FIG. 5, a schematic representation of a transmitter and receiver pair of transducers 16a and 16b is shown, and notably, the transmitting and receiving roles are interchangeable. With respect to transducer 16a, a field of view cone 302 is indicated, representing the field of view data. Once more, when transducer 16a is functioning as a transmitter, cone 302 represents the range of angles at which the ultrasonic signal is emitted, and when transducer 16a is functioning as a receiver, cone 302 represents the range of angles at which the ultrasonic signal can be received. For purposes of clarity, in this view cone 302 is shown as having a relatively narrow range of angles and the actual transmission or reception range may be greater. In practice, the actual range will depend on the physical and electrical characteristics of the specific transducer being used and in some embodiments, may be approximately 180° for both transmission and reception. Also for clarity, FIG. 5 is schematically represented in two dimensions, but the techniques may be extended to three dimensions. Based on the orientation of transducer 16a, a pointing vector 304 may be established, which defines the center of cone 302. Further, a position vector 306 may represent a straight line propagation from transducer 16a to transducer 16b. Position vector 306 does not depend on the orientation of either transducer 16a or 16b, but rather on the determined relative position the transducers. Accordingly, in this embodiment, the angular difference between pointing vector 304 and position vector 306 may readily be determined and compared to the field of view data. For example, if this angular difference is within one half the range of cone 302, a positive field of view relationship exists between transducer 16a and 16b. Different methods may be used to calculate the field of view relationship. For example, the dot product of orientation vector 304 and position vector 306 gives the cosine of the angle between these vectors, and this angle may then be compared to the field of view data of the transducer. As discussed above, this field of view relationship may be expressed as a reception probability and used to weight the ultrasonic measurement of an emitted and received signal. As desired, the calculation can be performed from the perspective of transducer 16b instead, or the field of view relationship can be determined from both perspectives. It should be appreciated that this calculation is only a non-limiting illustration of one embodiment for determining the field of view relationship and any suitable technique may be employed.

Figure 6:
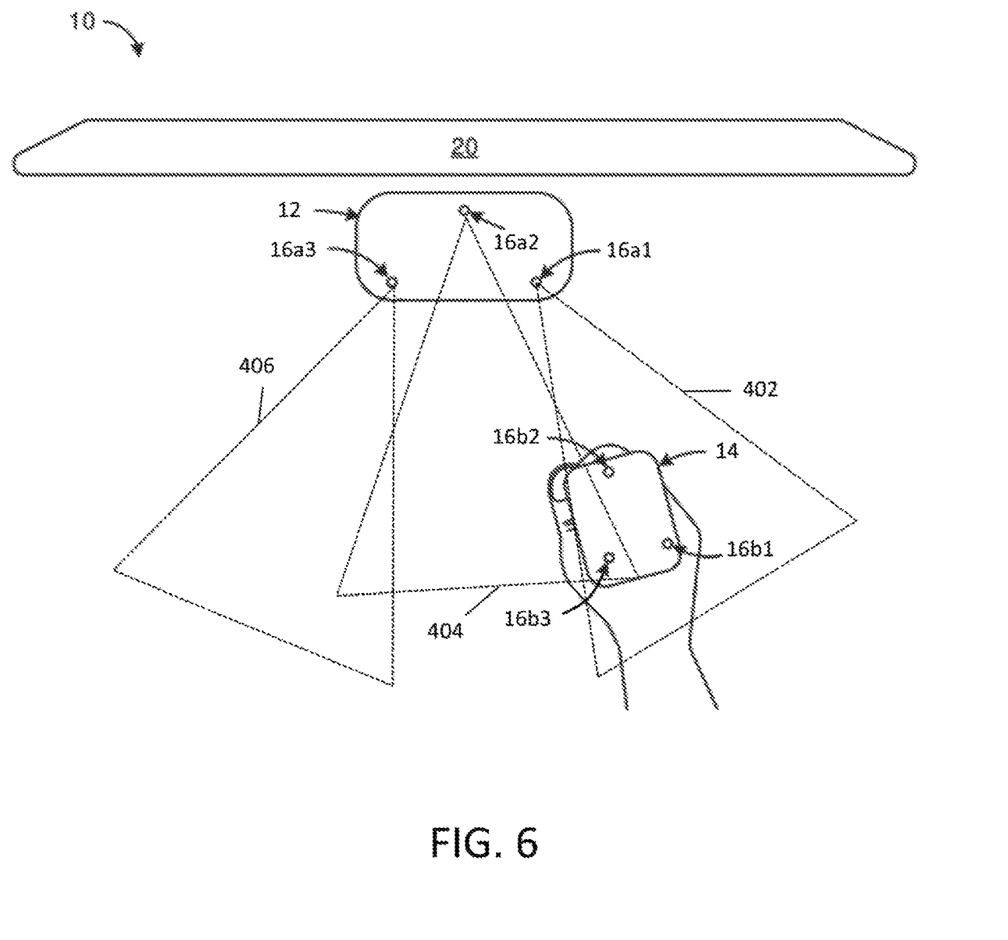
FIG. 6 is a schematic diagram showing different field of view relationships for devices having multiple transducers according to an embodiment.

Another schematic diagram representing the field of view relationship that may exist between transducer pairs is depicted in FIG. 6, which is a detail view of a portion of system 10 shown in FIG. 1. As discussed above, each of base station 12 and tracked object 14 may include multiple ultrasonic transducers 16, and in this view, the ultrasonic transducers of base station 12 are identified as 16a1, 16a2 and 16a3 while the ultrasonic transducers of tracked object 14 are identified as 16b1, 16b2 and 16b3. Further, in this representation, the field of view relationship is shown as being determined from the perspective of base station 12, but as discussed, the field of view relationship can also be determined from the perspective of tracked object 14 or from both perspectives. Still further, the field of view relationship may be determined for each transducer 16a1, 16a2 and 16a3 of base station 12 with respect to each transducer 16b1, 16b2 and 16b3 of tracked object 14. The field of view data for each transducer 16a1, 16a2 and 16a3 is used to determine the transmission or reception characteristics and cones 402, 404 and 406 schematically represent the field of view of these transducers, respectively. Again, for the sake of demonstration, the field of view is shown as being as being relatively narrow, but in many applications may be broader.

As indicated, each transducer 16b1, 16b2 and 16b3 of tracked object 14 is within the field of view of transducer 16a1, as represented by cone 402. However, only transducer 16b3 is within the field of view of transducer 16a2 and no transducers of tracked object 14 are within the field of view of transducer 16a3. In this example, any signals emitted from transducer 16a3 cannot be received by transducers 16b1, 16b2 or 16b3, without undergoing a reflection since there is no direct path based on the field of view relationship. Based on the discussion above, the corresponding ultrasonic measurements may then be weighted appropriately, with the assumption that signals cannot be directly received if the relevant transducer is not within the field of view. As one non-limiting illustration, all the measurements for transducer 16a1 can be included, all the measurements for 16a3 can be excluded and only the measurements with regard to transducer 16b3 can be included for transducer 16a2. Further, in some embodiments, the field of view relationship can be used to weight the measurements rather than simply including or excluding them. For example, with regard to transducer 16a1, the measurements with respect to transducer 16b1, which is closer to the center of the field of view, can be weighted more heavily than the measurements with respect to transducer 16b3, which is closer to the periphery of the field of view indicated by cone 402. In a further illustration of the techniques of this disclosure, it should be appreciated that weighting of ultrasonic measurements may take into account other aspects of the field of view relationship determined between transducer pairs. For example, the number of available transducers in a field of view relationship can be used. Since transducer 16a1 has three corresponding transducers that exhibit a field of view relationship as noted above, it may be desirable to use a more discriminatory weighting with regard to one of the corresponding transducers given that other sources of information (i.e., the other corresponding transducers) exist. Conversely, it may be desirable to use more permissive weighting with regard to transducer 16a2, which only has a field of view relationship with respect to transducer 16b3, and thus, only one source of information.

Figure 7A:
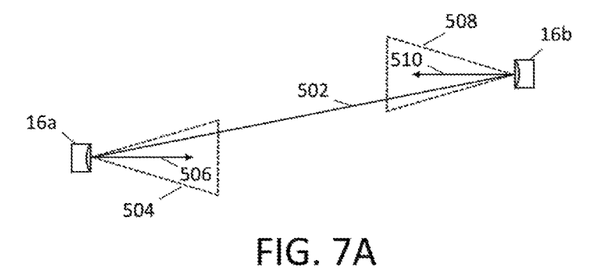
FIGS. 7A, 7B, 7C and 7D are schematic diagrams showing different field of view relationships considered from the perspectives of both of a pair of transducers according to an embodiment.
Figure 7B:
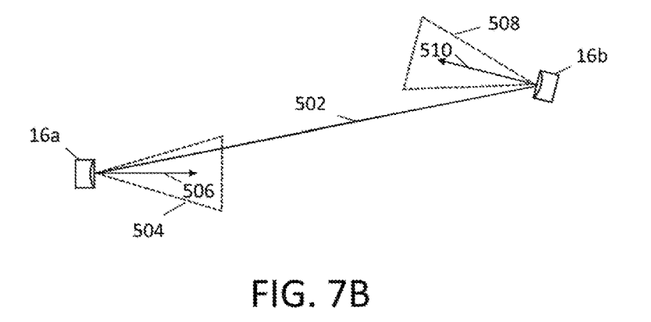
Figure 7C:
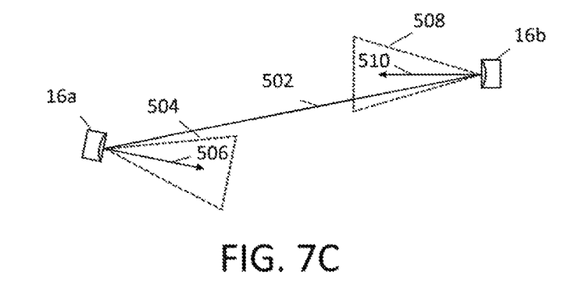
Figure 7D:
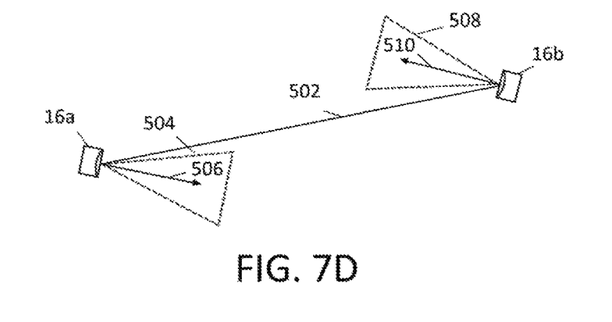

Yet another schematic representation of possible field of view relationships between a pair of transducers as determined from each perspective is shown in FIGS. 7A, 7B, 7C and 7D. In each, the transducer pair is again identified as 16a and 16b and either can function in the role of transmitter or receiver. Position vector 502 corresponds to the determined relative position between transducers 16a and 16b and has the appropriate directionality depending on which perspective is being considered. Transducer 16a is shown with a field of view indicated by field of view cone 504, having a pointing vector 506 and likewise, transducer 16b is shown with a field of view indicated by cone 508, having a pointing vector 510. When considering the field of view relationship from both perspectives, four possibilities exist as indicated by each view. Specifically, in FIG. 7A, the position vector 502 is within cone 504 from the perspective of transducer 16a and is also within cone 508 from the perspective of transducer 16b. Regardless of whether transducer 16a is functioning in the role of transmitter and transducer 16b is functioning in the role of receiver, or whether their roles are exchanged, both transducers are within each other's field of view such that a signal propagating along a line can be directly received. Signals transmitted from one of the transducers can be received by the other transducer. In FIGS. 7B and 7C, one transducer is within the field of view of its pair, but the converse relationship does not exist. Namely, in FIG. 7B, position vector 502 may be seen to be within cone 504 of transducer 16a, but is not within cone 508 of transducer 16b while FIG. 7C illustrates the opposite situation. Finally, in FIG. 7D, position vector 502 is not within cone 504 of transducer 16a or cone 508 of transducer 16b. For FIGS. 7B, 7C and 7D, signals transmitted from one of the transducers cannot be received by the other transducer, unless one or more intermediate reflections occur.

In some embodiment, measurements only having the field of view relationship shown in FIG. 7A may be used, with all others excluded. However, due to uncertainties in either the relative position determination, and therefore in position vector 502 and/or the orientations of transducers 16a and 16b, and therefore in cones 504 and 508, it may not be desirable to completely exclude ultrasonic measurements in these situations, but they can be accorded a relatively reduced weight. The weight may again depend on the field of view relationship, for example, how far the position vector is outside the field of view (cone). Similarly, ultrasonic measurements obtained under the conditions shown in FIG. 7D may be excluded or given a lower weight than in the other possibilities given the assumption that a signal cannot be directly received from the perspective of either transducer 16a or transducer 16b.

As noted above, it may be desirable to dynamically adjust how ultrasonic measurements are weighted and/or excluded over time based on changing circumstances. This section of the disclosure provide examples which should be considered non-limiting and for the purposes of illustrations only. As will be appreciated, the degree of confidence in the relative position and orientation determinations impacts the field of view relationship determination. Accordingly, as a general principle, it may be desirable to avoid excluding ultrasonic measurements when it is less certain that an ultrasonic cannot be received directly. For example, during start up or after reset or other initialization, ultrasonic measurements can be included or otherwise weighted normally (in other words, disabling the effect of the field of view relationship) until sufficient confidence exists in either or both the position and orientation determinations. Further, it may be desirable to wait for a period of time after a threshold confidence is reached to ensure stability. Other situations expected to have an effect on the confidence of the position and orientation determinations can also be used to adjust the behavior of the system. As another example, a relative large and sudden change in position or orientation, such as indicated by motion sensor data or the like, can be taken as a trigger for disabling the weighting under the assumption that greater uncertainty may exist. As noted above, use of a state estimation technique may provide a suitable measure of the confidence. Still further, it may be desirable to reset the system if a transducer has been determined to be out of a field of view for an inordinate length of time as this behavior would not normally be expected. In yet another illustration, it may be desirable to force a position or orientation determination to a preset to reduce the chance of the system being caught in an incorrect local minima.

As noted above, some embodiments utilize motion sensor data, such as from SPU 110. Desirably, position information from SPU 110 and the ultrasonic tracking system may augment each other. Accordingly, aspects of this disclosure may be considered to employ a tightly coupled architecture by integrating the motion sensor data with the ultrasonic measurements by weighting them. Rather than simply making pose information determinations separately with the motion sensor data and the ultrasonic measurements and then combining them in the position domain, the motion sensor data may be used directly to weight the ultrasonic measurements prior to being used for the TOF or TDOA pose information determinations. For example, the confidence in the motion sensor data may also influence the weighing of the ultrasonic measurements. As mentioned above, the confidence of the determined orientation may influence the weighing. In situations where the ultrasonic measurements are less reliable, the system may depend more on the motion data to determine pose information. However, motion sensors may have uncertainties in bias and sensitivities, which may lead to position errors and drift which increase over time. This means that the confidence in the pose information from the motion sensors may decrease over time, and as a result, the weighing of the ultrasonic measurements may be adapted accordingly.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer and gyroscope, which each provide a measurement along three axes that are orthogonal to each other. Such a device is often referred to as a 6-axis device. Other embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

A frame of reference for a portable device such as device 102 may be the body frame, having three orthogonal axes. Switching from the body frame to the world frame or any other suitable reference frame, or vice versa, may be performed by apply the appropriate rotation to the data. Similarly, the world frame may have axes fixed to the Earth, such as by aligning the Z axis of the world frame with the gravity vector resulting from Earth's gravity field, pointing from the surface of the Earth to the sky. Although the math and descriptions provided in this disclosure are in the context of these frames, one of skill in the art will realize that similar operations may be performed using other definitions and frames of reference. All the teachings could be redone with different definitions. Thus, the orientation of a portable device may be expressed as the rotational operation that translates the body frame to the world frame, such as a rotation operation that aligns the Z axis of the body frame with the gravity vector. In some embodiments, the rotation operation may be expressed in the form of a unit quaternion. As used herein, the terms "quaternion" and "unit quaternion" may be used interchangeably for convenience. Accordingly, a quaternion may be a four element vector describing the transition from one rotational orientation to another rotational orientation and may be used to represent the orientation of a portable device. A unit quaternion has a scalar term and 3 imaginary terms. In this disclosure, the quaternion is expressed with the scalar term first followed by the imaginary terms but, appropriate modifications may be made to the formulas, equations and operations to accommodate different definitions of quaternion.

As discussed above, a method according to this disclosure involves providing at least a first transmitter comprising an ultrasonic transducer, providing at least a first receiver comprising an ultrasonic transducer, determining a relative position in three dimensional space between the first transmitter and the first receiver, determining an orientation in three dimensional space of at least one of the first transmitter and the first receiver, obtaining field of view data for the at least one of first transmitter and the first receiver, determining a field of view relationship between the first transmitter and the first receiver based at least in part on the field of view data, the determined relative position and the determined orientation and determining pose information for at least one of the first transmitter and the first receiver by weighting measurements of an ultrasonic signal emitted by the first transmitter and received by the first receiver based at least in part on the determined field of view relationship.

In one aspect, the weighting the ultrasonic measurements may be based on a reception probability for the first receiver of the ultrasonic signal emitted by the first transmitter. Generating the field of view relationship between the first transmitter and the first receiver may include determining the reception probability based on the determined relative position and at least one of i) a determined orientation of the first receiver and field of view data for the first receiver; and ii) a determined orientation of the first transmitter and field of view data for the first transmitter. Further, determining the reception probability for the first receiver of the ultrasonic signal emitted by the first transmitter may be based on both.

In one aspect, determining the reception probability may involve using the field of view data to evaluate an angular difference between the relative position between the first receiver and the first transmitter and at least one of: i) a determined orientation of the first receiver; and ii) a determined orientation of the first transmitter.

In one aspect, the field of view data may be a definition of a cone describing a range of at least one of transmission and reception of ultrasonic signals.

In one aspect, the field of view data may be a transducer characteristic as a function of angle.

In one aspect, determining at least one of the relative position and the orientation may be based at least in part on transmitting and receiving ultrasonic signals.

In one aspect, at least one of the first transmitter and the first receiver may also have an inertial measurement unit and wherein at least one of the determined relative position and the determined orientation is based at least in part on information from the inertial measurement unit.

In one aspect, at least one of the first transmitter and the first receiver may also have an inertial measurement unit such that the weighting measurements of an ultrasonic signal emitted by the first transmitter and received by the first receiver is further based in part on pose information from the inertial measurement unit.

In one aspect, the field of view relationship may be used to determine whether the received ultrasonic signal is a direct signal or a reflected signal. The weighting may exclude measurements of the received ultrasonic signal when the received ultrasonic signal is a reflected signal. The weighting may use a nonzero weight when the received ultrasonic signal is a direct signal.

In one aspect, measurements of an ultrasonic signal may be fully weighted during initialization until a threshold is exceeded As indicated, the disclosure also relates to a system for tracking at least one object. The system includes a first transmitter having an ultrasonic transducer, a first receiver having an ultrasonic transducer, wherein the at least one object comprises either the first transmitter or the first receiver and at least one processor, which is configured to determine a relative position in three dimensional space between the first transmitter and the first receiver, determine an orientation in three dimensional space of at least one of the first transmitter and the first receive, obtain field of view data for at least one of the first transmitter and the first receiver, determine a field of view relationship between the first transmitter and the first receiver based at least in part on the field of view data, the determined relative position and the determined orientation and determine pose information for at least one of the first transmitter and the first receiver by weighting measurements of an ultrasonic signal emitted by the first transmitter and received by the first receiver based at least in part on the determined field of view relationship.

In one aspect, at least one of the first transmitter and the first receiver may also have an inertial measurement unit, such that at least one of the determined relative distance and the determined orientation is based at least in part on information from the inertial measurement unit.

In one aspect, the other of first transmitter or the first receiver may be a base station. For example, the at least one object may be a handheld controller. Further, the at least one object may be a wearable worn by a human. For example, the base station may be a head-mounted display worn by a human.

Still further, this disclosure may include a sensor processing unit, including a sensor and at least one processor configured to determine a relative position in three dimensional space between a first ultrasonic transmitter and a first ultrasonic receiver, determine an orientation in three dimensional space of at least one of the first transmitter and the first receiver, obtain field of view data for at least one of the first transmitter and the first receiver, determine a field of view relationship between the first transmitter and the first receiver based at least in part on the field of view data, the determined relative position and the determined orientation and determine pose information for at least one of the first transmitter and the first receiver by weighting measurements of an ultrasonic signal emitted by the first transmitter and received by the first receiver based at least in part on the determined field of view relationship. In one aspect, the sensor may be one of the first transmitter and the first receiver.

Although the present invention has been described in accordance with the embodiments shown, one of ordinary skill in the art will readily recognize that there may be variations to the embodiments and those variations would be within the spirit and scope of the present invention. For example, the techniques of this disclosure have been explained in the context of a HMD/base station and a controller, but the techniques may be applied in any other suitable context. One skilled in the art may readily devise other systems consistent with the disclosed embodiments which are intended to be within the scope of this disclosure.

What is claimed is:

1. A method comprising:
providing at least a first transmitter comprising an ultrasonic transducer;
providing at least a first receiver comprising an ultrasonic transducer;
determining a relative position in three dimensional space between the first transmitter and the first receiver;
determining an orientation in three dimensional space of at least one of the first transmitter and the first receiver;
obtaining field of view data for the at least one of first transmitter and the first receiver;
determining a field of view relationship between the first transmitter and the first receiver based at least in part on the field of view data, the determined relative position and the determined orientation; and
determining pose information for at least one of the first transmitter and the first receiver by weighting measurements of an ultrasonic signal emitted by the first transmitter and received by the first receiver based at least in part on the determined field of view relationship, wherein the determined field of view relationship includes discriminating whether the received ultrasonic signal is a direct signal or a reflected signal.

2. The method of claim 1, wherein the weighting the ultrasonic measurements is based on a reception probability for the first receiver of the ultrasonic signal emitted by the first transmitter.

3. The method of claim 2, wherein generating the field of view relationship between the first transmitter and the first receiver comprises determining the reception probability based on the determined relative position and at least one of:
i) a determined orientation of the first receiver and field of view data for the first receiver; and
ii) a determined orientation of the first transmitter and field of view data for the first transmitter.

4. The method of claim 3, wherein determining the reception probability for the first receiver of the ultrasonic signal emitted by the first transmitter is based on both:
i) a determined orientation of the first receiver and field of view data for the first receiver; and
ii) a determined orientation of the first transmitter and field of view data for the first transmitter.

5. The method of claim 2, wherein determining the reception probability comprises using the field of view data to evaluate an angular difference between the relative position between the first receiver and the first transmitter and at least one of:
   i) a determined orientation of the first receiver; and
   ii) a determined orientation of the first transmitter.

6. The method of claim 1, wherein the field of view data comprises a definition of a cone describing a range of at least one of transmission and reception of ultrasonic signals.

7. The method of claim 1, wherein the field of view data comprises a transducer characteristic as a function of angle.

8. The method of claim 1, wherein determining at least one of the relative position and the orientation is based at least in part on transmitting and receiving ultrasonic signals.

9. The method of claim 1, wherein at least one of the first transmitter and the first receiver further comprises an inertial measurement unit and wherein at least one of the determined relative position and the determined orientation is based at least in part on information from the inertial measurement unit.

10. The method of claim 1, wherein at least one of the first transmitter and the first receiver further comprises an inertial measurement unit and wherein the weighting measurements of an ultrasonic signal emitted by the first transmitter and received by the first receiver is further based in part on pose information from the inertial measurement unit.

11. The method of claim 1, wherein the weighting excludes measurements of the received ultrasonic signal when the received ultrasonic signal is a reflected signal.

12. The method of claim 1, wherein the weighting uses a nonzero weight when the received ultrasonic signal is a direct signal.

13. The method of claim 1, further comprising fully weighting measurements of an ultrasonic signal during initialization until a threshold is exceeded.

14. A system for tracking at least one object, comprising:
   a first transmitter having an ultrasonic transducer;
   a first receiver having an ultrasonic transducer, wherein the at least one object comprises either the first transmitter or the first receiver; and
   at least one processor configured to:
   determine a relative position in three dimensional space between the first transmitter and the first receiver;
   determine an orientation in three dimensional space of at least one of the first transmitter and the first receiver;
   obtain field of view data for at least one of the first transmitter and the first receiver;
   determine a field of view relationship between the first transmitter and the first receiver based at least in part on the field of view data, the determined relative position and the determined orientation; and
   determine pose information for at least one of the first transmitter and the first receiver by weighting measurements of an ultrasonic signal emitted by the first transmitter and received by the first receiver based at least in part on the determined field of view relationship, wherein the determined field of view relationship includes discriminating whether the received ultrasonic signal is a direct signal or a reflected signal.

15. The system of claim 14, wherein the at least one of the first transmitter and the first receiver further comprises an inertial measurement unit and wherein at least one of the determined relative distance and the determined orientation is based at least in part on information from the inertial measurement unit.

16. The system of claim 14, wherein the other of first transmitter or the first receiver is a base station.

17. The system of claim 16, wherein the at least one object is a handheld controller.

18. The system of claim 16, wherein the at least one object is wearable worn by a human.

19. The system of claim 16, wherein the base station is a head-mounted display worn by a human.

20. A sensor processing unit comprising:
   a sensor; and
   at least one processor configured to:
   determine a relative position in three dimensional space between a first ultrasonic transmitter and a first ultrasonic receiver;
   determine an orientation in three dimensional space of at least one of the first transmitter and the first receiver;
   obtain field of view data for at least one of the first transmitter and the first receiver;
   determine a field of view relationship between the first transmitter and the first receiver based at least in part on the field of view data, the determined relative position and the determined orientation; and
   determine pose information for at least one of the first transmitter and the first receiver by weighting measurements of an ultrasonic signal emitted by the first transmitter and received by the first receiver based at least in part on the determined field of view relationship, wherein the determined field of view relationship includes discriminating whether the received ultrasonic signal is a direct signal or a reflected signal.

21. The sensor processing unit of claim 20, wherein the sensor comprises one of the first ultrasonic transmitter and the first ultrasonic receiver.

* * * * *